US011099577B2

(12) United States Patent
Li

(10) Patent No.: US 11,099,577 B2
(45) Date of Patent: Aug. 24, 2021

(54) LOCALIZATION METHOD AND SYSTEM, AND ROBOT USING THE SAME

(71) Applicant: ANKOBOT (SHANGHAI) SMART TECHNOLOGIES CO., LTD., Shanghai (CN)

(72) Inventor: Lei Li, Shanghai (CN)

(73) Assignee: ANKOBOT (SHANGHAI) SMART TECHNOLOGIES CO., LTD., Shanghai (CN)

(*) Notice: Subject to any disclaimer, the term of this patent is extended or adjusted under 35 U.S.C. 154(b) by 0 days.

(21) Appl. No.: 16/764,513

(22) PCT Filed: Jun. 11, 2018

(86) PCT No.: PCT/CN2018/090653
§ 371 (c)(1),
(2) Date: Aug. 5, 2020

(87) PCT Pub. No.: WO2019/095681
PCT Pub. Date: May 23, 2019

(65) Prior Publication Data
US 2021/0011483 A1 Jan. 14, 2021

(30) Foreign Application Priority Data
Nov. 16, 2017 (CN) .......................... 201711136700.3

(51) Int. Cl.
G05D 1/02 (2020.01)
G01C 21/20 (2006.01)
G06T 7/73 (2017.01)

(52) U.S. Cl.
CPC ........... G05D 1/0246 (2013.01); G01C 21/20 (2013.01); G06T 7/74 (2017.01)

(58) Field of Classification Search
CPC ............... G05D 1/0246; G05D 1/0274; G05D 2201/0203; G05D 1/02; G06T 7/70; G06T 7/74; G01C 21/20
See application file for complete search history.

(56) References Cited

U.S. PATENT DOCUMENTS

| 7,720,554 B2 * | 5/2010 | DiBernardo ............ G01S 17/48 700/56 |
| 9,427,874 B1 * | 8/2016 | Rublee ................. B25J 11/0075 |

(Continued)

FOREIGN PATENT DOCUMENTS

| CN | 101114337 A | 1/2008 |
| CN | 102135429 A | 7/2011 |

(Continued)

OTHER PUBLICATIONS

Chinese Patent Application No. 2017111367003 Office Action dated Dec. 3, 2018, with English translation, 11 pages.

(Continued)

Primary Examiner — Peter D Nolan
Assistant Examiner — Demetra R Smith-Stewart
(74) Attorney, Agent, or Firm — Leber IP Law; David C. Robertson

(57) ABSTRACT

A localization method and system, and a robot using the same are disclosed. The localization method comprises: capturing an image in a navigation operating environment of a robot; identifying patterns of objects in the image, and when the identified at least one pattern is a standard pattern corresponding to a standard part, acquiring a standard physical feature of the standard part; determining localization information of the robot in a current physical space based on the standard physical feature of the standard part and the standard pattern. Through the localization method of present application, the problem of inaccurate localization of the (Continued)

robot based on data provided by sensors in the prior art can be solved.

17 Claims, 3 Drawing Sheets

(56) References Cited

U.S. PATENT DOCUMENTS

| | | | |
|---|---|---|---|
| 2002/0176010 A1* | 11/2002 | Wallach | H04N 5/235 |
| | | | 348/229.1 |
| 2010/0152945 A1 | 6/2010 | Park et al. | |
| 2012/0106829 A1* | 5/2012 | Lee | G05D 1/0274 |
| | | | 382/153 |
| 2013/0138246 A1* | 5/2013 | Gutmann | G05D 1/0274 |
| | | | 700/253 |
| 2014/0058667 A1* | 2/2014 | Schuh | G01S 5/16 |
| | | | 701/514 |
| 2016/0271795 A1* | 9/2016 | Vicenti | B25J 9/163 |
| 2016/0375592 A1* | 12/2016 | Szatmary | B25J 9/1676 |
| | | | 700/255 |
| 2018/0279847 A1* | 10/2018 | Park | A47L 11/4011 |
| 2018/0329617 A1* | 11/2018 | Jones | G06F 3/04817 |
| 2019/0204844 A1* | 7/2019 | Lau | G05B 15/02 |
| 2019/0213438 A1* | 7/2019 | Jones | G06T 7/74 |

FOREIGN PATENT DOCUMENTS

| | | |
|---|---|---|
| CN | 104062973 A | 9/2014 |
| CN | 105352508 A | 2/2016 |
| CN | 105486311 A | 4/2016 |
| CN | 105806337 A | 7/2016 |
| CN | 105865451 A | 8/2016 |
| CN | 106643801 A | 5/2017 |
| CN | 106959691 A | 7/2017 |
| CN | 107328420 A | 11/2017 |
| CN | 107680135 A | 2/2018 |
| WO | 2016/148743 A1 | 9/2016 |

OTHER PUBLICATIONS

Chinese Patent Application No. 2017111367003 Office Action dated Jan. 31, 2019, with English translation, 16 pages.
International Patent Application No. PCT/CN2018/090653, International Search Report dated Aug. 31, 2018, including English translation of International Search Report, 7 pages.
International Patent Application No. PCT/CN2018/090653, English translation of International Preliminary Report on Patentability dated May 19, 2020, and Written Opinion dated Aug. 31, 2018 with English translation of the Written Opinion, 11 pages.
Chinese Patent Application No. 2017111367003 Notice of Grant with English translation, dated Jun. 14, 2019, 3 pages.
European Patent Application No. 18878085.2 Search Report dated Nov. 25, 2020, 4 pages.
European Patent Application No. 18878085.2 Office Action dated Dec. 7, 2020, 6 pages.
European Patent Application No. 18878085.2 Office Action dated Apr. 1, 2021, 7 pages.
I-Hsum Li; et al; "Mobile Robot Self-Localization System Using Single Webcam Distance Measurement Technology in Indoor Environments", Sensors, vol. 14, No. 2, Jan. 27, 2014 (Jan. 27, 2014), XP055749268, pp. 2089-2109.

* cited by examiner

LOCALIZATION METHOD AND SYSTEM, AND ROBOT USING THE SAME

RELATED APPLICATIONS

This application is a national phase entry of International Patent Application No. PCT/CN2018/090653, filed Jun. 11, 2018, which claims priority from Chinese Patent Application No. 201711136700.3, filed Nov. 16, 2017, now Chinese Patent No. 107680135 B, granted Jul. 23, 2019, the entire disclosures of which are incorporated herein by reference.

FIELD

The present application relates to the technical field of indoor localization, and in particular to a localization method and system, and a robot using the same.

BACKGROUND

A mobile robot is a machine which works automatically. The mobile robot can be operated under the command of human operators or in pre-programmed programs, and can act according to principles set out by the artificial intelligence technology. This type of mobile robot can be used indoors or outdoors, and can be used in industry or household. For example, the mobile robot can be used to replace security guards to perform patrol, or replace people to clean the surface. The mobile robot can also be used to accompany family members or assist in doing office work. Because of the differences among fields to which different mobile robots are applied, moving modes of the mobile robots in various fields are different. For example, the mobile robots can use wheel-type moving mode, walking-type moving mode or chain-type moving mode. With the development of motion control technology of mobile robots, simultaneous localization and mapping (SLAM) and VSLAM are performed based on the movement information provided by motion sensors and image sensors, so as to provide more accurate navigation capabilities for the mobile robots, thus the autonomous movement of mobile robots can be more effective. However, by taking a cleaning robot as an example, the travel distances of wheel moving over surfaces with different materials are not the same, and the map error will increase with time in image-sensor-based VSLAM, so that there are large differences between a map built by the SLAM and VSLAM and a map in the actual physical space.

SUMMARY

In view of the above-mentioned shortcomings in the prior art, the present application provides a localization method and system, and a robot using the same, for solving the problem of inaccurate localization of a robot based on data provided by sensors in the prior art.

To achieve the above and other related purpose, in the first aspect, the present application provides a localization method for a robot. The localization method for a robot comprises: capturing an image in a navigation operation environment of the robot; identifying patterns of objects in the image, and when the identified at least one pattern is a standard pattern corresponding to a standard part, acquiring a standard physical feature of the standard part; and determining localization information of the robot in a current physical space based on the standard physical feature of the standard part and the standard pattern.

In the second aspect, the present application provides a localization system for a robot. The localization system for a robot comprises: an image acquisition device, configured to capture an image in a navigation operation environment of the robot; a storage device, configured to pre-store a localization and mapping application and a behavior control application, and a standard physical feature of at least one standard part; a localization processing device, connected with the image acquisition device and the storage device, and configured to invoke the localization and mapping application to perform the following steps: identifying patterns of objects in the image, and when the identified at least one pattern is a standard pattern corresponding to a standard part, acquiring a standard physical feature of the standard part; and determining localization information of the robot in a current physical space based on the standard physical feature of the standard part and the standard pattern.

In the third aspect, the present application provides a robot. The robot comprises: a driving device, configured to drive the robot to perform displacement and/or pose adjustment; an image acquisition device, configured to capture an image in a navigation operation environment of the robot; a storage device, configured to pre-store a localization and mapping application and a behavior control application, and a standard physical feature of at least one standard part; a localization processing device, connected with the driving device, the image acquisition device and the storage device, and configured to invoke the pre-stored localization and mapping application to perform the following steps: identifying patterns of objects in the image, and when the identified at least one pattern is a standard pattern corresponding to a standard part, acquiring a standard physical feature of the standard part; and determining localization information of the robot in a current physical space based on the standard pattern and the standard physical feature of the standard part.

In the forth aspect, the present application provides a storage medium of an electronic device, the storage medium is configured to store one or more programs, when the one or more computer programs are executed by one or more processors, the one or more processors implement the localization method mentioned above.

As described above, the localization method and system, and the robot using the same have the following beneficial effects: in the localization method for a robot of present application, through a technical solution of identifying patterns of objects in a captured image and matching each pattern with a pattern of a standard part, and determining localization information of a robot in a current physical space based on a standard physical feature of the standard part, the problem of inaccurate localization of the robot based on data provided by sensors in the prior art can be solved.

DETAILED DESCRIPTION OF THE EMBODIMENTS

Figure 1:
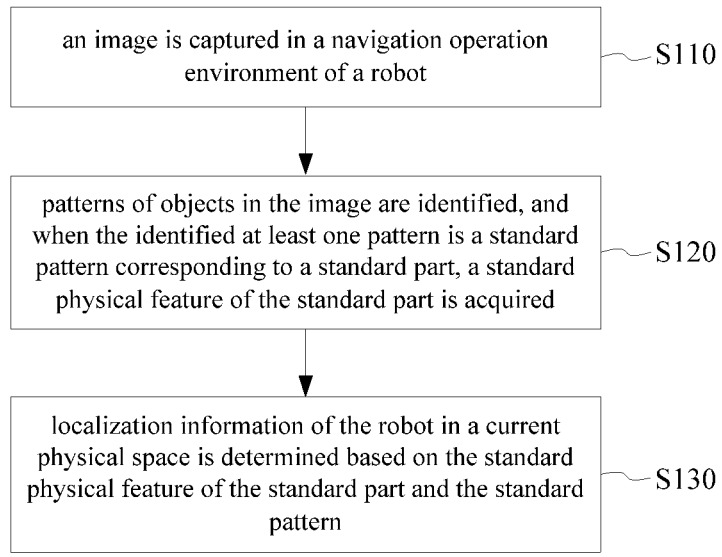
FIG. 1 shows a flow diagram of a localization method for a robot of the present application in an embodiment.

Implementations of the present application will be described below through specific embodiments, and those skilled in the art can easily understand other advantages and effects of the present application from the contents disclosed in the present specification.

In the following description, several embodiments of this application are described combined with the drawings. However, it should be understood that other embodiments may be available, and any changes in mechanical composition, structure, electrical and operation may be made without departing from the spirit and scope of the application. The following detailed description is not to be considered as limited, and the scope of the embodiments of the present application is defined by the appended claims.

Moreover, as used herein, such single forms as "one", "a" and "the" aim at also including the plural forms, unless contrarily indicted in the text. It should be further understood that, such terms as "comprise" and "include" indicate the existence of the features, steps, operations, elements, components, items, types and/or groups, but do not exclude the existence, emergence or addition of one or more other features, steps, operations, elements, components, items, types and/or groups. The terms "or" and "and/or" used herein are explained to be inclusive, or indicate any one or any combination. Therefore, "A, B or C" or "A, B and/or C" indicates "any of the following: A; B; C; A and B; A and C; B and C; A, B and C". Exceptions of the definition only exist when the combinations of elements, functions, steps or operations are mutually exclusive inherently in some ways.

On the basis of the continuous localization accumulation and in combination with other preset or acquired information related to movement, a mobile robot can build map data of the site where the robot is located, and can also provide route planning, route planning adjustment and navigation service based on the built map data, so that the movement efficiency of the mobile robot becomes higher. Taking a cleaning robot as an example, for example, an indoor cleaning robot can pre-determine the distance between the current position thereof and an obstacle marked on the indoor map according to the built indoor map and the localization technology, so as to adjust the cleaning policy in time. Wherein, the obstacle can be described by a single marker, or can be marked as a wall, a table, a sofa or a wardrobe through identification of shape, dimension and so on. And for example, the indoor cleaning robot can accumulate all positions and orientations determined based on the localization technology, and build the indoor map according to changes in the accumulated positions and orientations. Taking a patrol robot as an example, since the patrol robot is applied to a plant area, an industrial park and other scenarios in general, the patrol robot can pre-determine the distance between the current position and a corner, an intersection, a charging pile and other positions according to the built plant area map and the localization technology, so as to control the movement of the movement device of the robot in time according to other acquired monitoring data.

For mobile robots used in other application scenarios which being analogized based on the example of the above-mentioned mobile robot, in order to increase the localization accuracy of mobile robots and reduce the accumulative errors of sensors, the present application provides a localization method for a robot. The localization method can be used in cleaning robots. Please refer to FIG. 1, which shows a flow diagram of a localization method for a robot of the present application in an embodiment. As shown in the figure, the localization method for a robot of the present application includes steps S110, S120 and S130.

In step S110, an image is captured in a navigation operation environment of a robot.

Here, an image acquisition device is used to capture an image in the navigation operation environment of the robot. The image acquisition device includes but is not limited to: a camera, a video camera, an image acquisition module integrated with an optical system or a CCD chip, an image acquisition module integrated with an optical system and a CMOS chip, etc. A power supply system of the image acquisition device is controlled by a power supply system of the robot. When the robot is powered on and moves, the image acquisition device starts to capture images. In addition, the image acquisition device is positioned on a body of the robot. Taking a cleaning robot as an example, the image acquisition device is positioned in the middle or at an edge of a top cover of the cleaning robot, or the image acquisition device is positioned within a recessed structure beneath the plane of the top surface near a geometric center of the body or near an edge of the body. In addition, an angle between the optical axis of the image acquisition device and a vertical line is set as an angle of ±30°, or an angle between the optical axis of the image acquisition device and a horizontal line is set as an angle of 0-180°. The navigation operation environment refers to an environment in which the robot moves according to a navigation route designed based on map data or according to a randomly designed navigation route, and performs a corresponding operation. Taking a cleaning robot as an example, the navigation operating environment refers to an environment in which the cleaning robot moves according to a navigation route and performs a cleaning operation.

In step S120, patterns of objects in the image are identified, and when the identified at least one pattern is a standard pattern corresponding to a standard part, a standard physical feature of the standard part is acquired.

Here, a localization processing device is used to identify patterns of objects in the image, and when the identified at least one pattern is a standard pattern corresponding to a standard part, a standard physical feature of the standard part is acquired. The localization processing device includes one or more processors. The processor processes, analyzes and understands the captured images through an image identification method such as a neural network-based image identification method or a wavelet-based image identification method so as to identify targets and objects in various modes. In addition, the processor also finds similar image targets through analysis of corresponding relationship, similarity and consistency in image content, feature, structure, relationship, texture, and gray scale. The above-mentioned processors may be shared or may be provided independently.

In addition, the standard part includes a standard part designed based on at least one of industry standard, national standard, international standard, and custom standard. For example, the industry standard includes machinery industry standard JB, building materials industry standard JC, etc.; the national standard includes Chinese GB standard, German DIN standard, British BS standard, etc.; the international standard includes international ISO standard; and the custom standard will be detailed later. In addition, the standard physical feature includes overall dimension, standard structural relationship, etc. For example, the standard physical feature of the standard part includes the actual physical length, width and height of the standard part, other actual physical dimensional data of corresponding standard in the standard part, etc. An example is a distance between two holes of a power socket. Another example is the length and width of the power socket.

In an embodiment, taking a cleaning robot as an example. As the cleaning robot usually performs indoor cleaning work, objects in the images captured by the image acquisition device generally include, for example, wall, table, sofa, wardrobe, television, power socket, network cable socket, etc. In an example, first, the image acquisition device captures an image in the navigation operation environment of the robot, and then the image acquisition device provides the image to the localization processing device, and the localization processing device identifies patterns of objects in the captured image through image identification. The pattern of the object is characterized by the gray scale of the object, the contour of the object or other features of the object. Furthermore, the pattern of the object is not limited to an external geometric figure of the object, also includes other pattern presented on the object, such as a two-hole jack or a five-hole jack on a power socket, and a square jack on a network cable socket, etc. In view of this, for example, for a power socket and a network cable socket with similar external geometric figures, a five-hole jack of the power socket and a square jack of the network cable socket are used to distinguish therebetween. In addition, in the case where the object in the image captured by the image acquisition device of the cleaning robot indoors includes a power socket or a network cable socket, since the power socket and the network cable socket are designed according to the GB standard, the power socket and the network cable socket do not change depending on the environment where they located, the power socket and the network cable socket are used as standard parts. In this example, the standard part is a power socket. The standard physical features of the standard part include the length, width and height of the power socket, and a structural relationship of a five-hole jack on the power socket, and so on. In some embodiments, the pattern of the standard part and the standard physical feature of the standard part are preset, and pre-stored by a storage device of the robot. Therefore, a manner of acquiring the standard physical feature of the standard part includes reading a preset standard physical feature from the storage device of the robot.

And, with respect to the pattern of the object in the identified image and the stored pattern of the standard part such as the power socket, the localization processing device determines whether the identified at least one pattern matches with the stored pattern of the power socket through analysis of corresponding relationship, similarity and consistency in image content, feature, structure, relationship, texture, or gray scale and so on, and when the identified at least one pattern matches with the stored pattern of the power socket, the standard physical feature of the power socket is acquired. The at least one pattern corresponding to the stored pattern of the power socket is named as a standard pattern. In this example, the standard pattern is the pattern of the captured power socket.

In step S130, localization information of the robot in a current physical space is determined based on the standard physical feature of the standard part and the standard pattern.

Here, the localization processing device is used to determine localization information of the robot in the current physical space based on the standard pattern and the standard physical feature of the standard part. The localization processing device includes a processor. In an example, according to a corresponding relationship between a preset unit pixel spacing and a unit length in the actual physical space, the size of the identified standard pattern and the real size of the corresponding standard physical feature, the processor calculates a distance and an angle of the robot relative to the standard part in the current physical space, to obtain the localization information of the robot relative to the standard part. Taking a socket positioned on a wall as an example, when the processor identifies the socket and a boundary line between the wall and the ground, or identifies the socket and defaults to the installation of the socket on the wall, according to the above-mentioned corresponding relationship, the processor not only obtains the distance and angle of the robot relative to the socket, but also obtains a straight-line distance between the robot and the wall according to a spatial positional relationships among the wall, the robot and the socket, thus the localization information of the robot relative to the wall is obtained. In addition, the processor in this step and the processor in the above step may be shared or may be provided independently.

In the localization method for a robot of present application, through a technical solution of identifying patterns of objects in the captured image and matching each pattern with a pattern of a standard part, and determining localization information of a robot in a current physical space based on a standard physical feature of the standard part, the problem of inaccurate localization of the robot based on data provided by a sensor in the prior art can be solved.

In some embodiments, a manner of acquiring a standard physical feature of the standard part in step S120 includes acquiring the standard physical feature from a remote server through a network. In an embodiment, the localization processing device includes a processor, which provides a retrieval request, that is, a standard pattern, to a remote server through a network, and the remote server performs a retrieval through a CBIR (Content-based Image Retrieval, CBIR for short) method according to the request and determines a retrieval result, that is, a pattern of the standard part obtained by the retrieval, and then, the remote server outputs a standard physical feature of the standard part based on the acquired pattern of the standard part, and provides the standard physical feature to the processor through the network for subsequent processing.

In some embodiments, in addition to a standard part designed based on at least one of industry standard, national standard, and international standard, the standard part also includes a standard part designed based on custom standard. The standard part designed based on custom standard is a standard part customized by a robot manufacturer, such as a standard part that is designed and manufactured by a robot manufacturer and is used with the robot in the operation environment of the robot. The standard part designed based on custom standard is a standard part with a standard physical feature generated based on physical parameters input by a user. In an embodiment, taking a cleaning robot as an example, the object in an image captured by an image acquisition device during operation of the cleaning robot in a living room generally includes household appliances such as a TV, so the user may design the TV as a standard part. Specifically, the user may obtain physical parameters of the TV through reading an instruction manual of the TV or product information, and input the physical parameters via an input device such as a robot application APP to generate a standard part with a standard physical feature. In addition, other objects may be chosen by the user as the standard part according to the indoor environment. The localization method for a robot of the present application uses the user-defined standard part, so that the standard part can be chosen by the user according to the indoor environment, which is helpful for accurate localization of the robot.

In some embodiments, a manner of determining localization information of the robot in a current physical space based on the standard pattern and the standard physical feature of the standard part in step S130 includes: performing an angle correction on the standard pattern based on the standard physical feature to obtain an angle of the robot relative to a plane where the standard part is located; and performing a distance measurement on the corrected pattern based on the standard physical feature to obtain a distance between the robot and the standard part and a distance between the robot and the plane where the standard part is located.

Taking a standard part identified by the localization processing device being a two-hole power socket as an example, according to the size feature and angle feature of each hole in the standard physical features of the two-hole power socket, the actual physical spacing and angle features between the two holes, the pixel size and pixel angle of each hole in the standard pattern of the two-hole power socket identified in the image, and the pixel spacing and pixel angle between the two holes, the localization processing device determines an angle between a photographing surface of the image acquisition device and a plane where the two-hole power socket is located. The localization processing device obtains an angle of the robot relative to the plane where the standard part is located according to the obtained angle.

To facilitate the calculation of the distance from the robot to the standard part, the localization processing device corrects the standard pattern according to the obtained angle to obtain a standard pattern in the photographing surface parallel to the plane where the standard part is located. Then, distance measurement is performed according to a proportional relationship between the actual physical size and the pixel size of the standard pattern in the image, to obtain a distance between the robot and the standard part and a distance between the robot and the plane where the standard part is located.

After the angle of the robot relative to the plane where the standard part is located and the distances from the robot to the standard part and to the plane where the standard part is located are obtained, a current position and orientation of the robot are determined, that is, localization information of the robot in the current physical space is determined. The obtained localization information is used in navigation, mapping, map data correction and the like for the robot. Especially in indoor localization and mapping technology, the localization information obtained through the localization method in the present application can correct map data in time, so that indoor map data can be built and used as accurately as possible in a case that accurate indoor map data cannot be obtained in advance.

Figure 2:
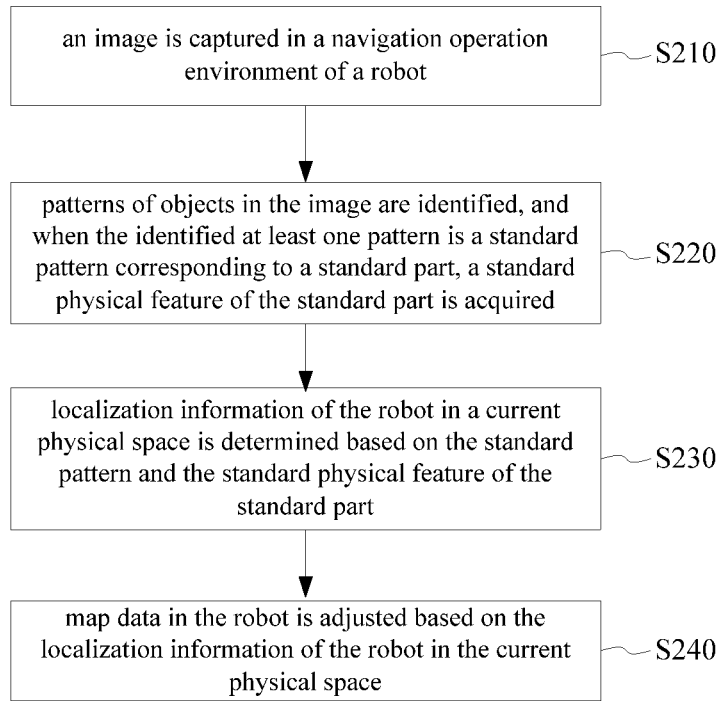
FIG. 2 shows a flow diagram of the localization method for a robot of the present application in another embodiment.

Please refer to FIG. 2, which shows a flow diagram of the localization method for a robot of the present application in another embodiment. As shown in the figure, the localization method for a robot of the present application includes: steps S210, S220, S230 and S240.

In step S210, an image is captured in a navigation operation environment of a robot.

Here, an image acquisition device is used to capture an image in the navigation operation environment of the robot. Step S210 is the same as or similar to step S110 in the foregoing example, and will not be described in detail here.

In step S220, patterns of objects in the image are identified, and when the identified at least one pattern is a standard pattern corresponding to a standard part, a standard physical feature of the standard part is acquired.

Here, a localization processing device is used to identify patterns of objects in the image, and when the identified at least one pattern is a standard pattern corresponding to a standard part, a standard physical feature of the standard part is acquired. Step S220 is same as or similar to step S120 in the foregoing example, and will not be described in detail here.

In step S230, localization information of the robot in a current physical space is determined based on the standard pattern and the standard physical feature of the standard part.

Here, the localization processing device is used to determine localization information of the robot in the current physical space based on the standard pattern and the standard physical feature of the standard part. Step S230 is same as or similar to step S130 in the foregoing example, and will not be described in detail here.

In step S240, map data in the robot is adjusted based on the localization information of the robot in the current physical space.

Here, a control device of the robot is used to adjust map data in the robot based on the localization information of the robot in the current physical space. The control device of the robot includes one or more processors (CPUs) or micro control units (MCUs) dedicated to the control of the robot. In addition, the processor in the control device and the processor in the above-mentioned localization processing device may be shared or provided independently. For example, the control device serves as a slave processing device, the processor in the localization processing device serves as a master device, and the control device controls the adjustment based on localization of the localization processing device. Alternatively, the processor in the control device and the processor in the localization device are a shared one.

Taking a cleaning robot as an example, the map data of the cleaning robot is generally built based on mobile data provided by a plurality of mobile sensors provided on the robot such as speed sensor, an odometer sensor, a ranging sensor, and a cliff sensor, as well as image data provided by the image acquisition device. Due to there are accumulated errors in the process of building a map using the mobile sensors and the image acquisition device, when the robot moves to a position, there is a deviation between the localization information of the robot in the current physical space determined through the localization method for a robot and the map data, and thus the map data is required to be adjusted. Here, after determining the localization information of the robot in the current physical space, the localization processing device provides the localization information to the control device, and the control device adjusts the map data in the robot based on the localization information. The map data includes but is not limited to, position and angle data described in a preset grid or coordinate space based on the mobile data provided by the mobile sensors and the image data, and landmark information marked in the preset grid or coordinate space based on identified object features, etc. The map data is used for map building and navigation.

In the localization method for a robot of the present application, through a technical solution of identifying patterns of objects in a captured image and matching each pattern with a pattern of a standard part, and determining localization information of a robot in a current physical space based on a standard physical feature of the standard part, and adjusting map data in the robot based on the localization information, a localization error in the map data can be compensated according to the localization information and the accurate localization can be achieved.

In some embodiments, a manner of adjusting map data in the robot based on the localization information of the robot in the current physical space in step S240 includes: compensating for a localization error of a corresponding position in the map data based on the localization information; and/or compensating for a localization error in landmark information related to the standard part in the map data based on the localization information.

Figure 3:
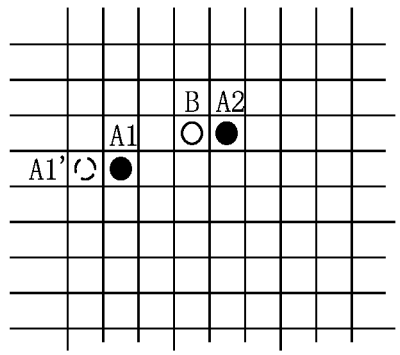
FIG. 3 shows a schematic diagram of compensating for localization errors of position A1 and position A2 in map data by using localization information B determined by the localization method in the present application.

In a specific example, when the robot does not identify the standard part, it builds map data according to the mobile data provided by the mobile sensors. When the robot identifies the standard part, and determines the localization information of the robot in the current physical space based on the identified standard pattern and the standard physical feature of the corresponding standard part, the control device compares the localization information and a localization information determined based on the mobile data to determine whether there are a position and angle deviation, and if so, the localization information determined based on the mobile data may be replaced with the localization information of the standard part, and other map data is corrected based on the position and angle deviation between the two types of localization information. For example, please refer to FIG. 3, which shows a schematic diagram of compensating for localization errors of position A1 and position A2 in the map data according to localization information B determined through the localization method in the present application. The position A1 and position A2 are localization information determined based on the mobile data. When the localization processing device identifies a standard part at the position A2 and determines the current localization information B based on the identified standard part, it replaces the position A2 with the localization information B, and as the localization information B is on the left of A2 with a deviation of one grid, the localization information of A1 is also adjusted to the left by one grid to obtain A1' as denoted by a dotted line to compensate for the localization error of the mobile data at the position A1.

In another specific example, when localization is performed based on images and map data is built according to this image localization, the map data includes landmark information. The landmark information is used to assist the robot to be localized based on images. The landmark information includes but is not limited to: features (such as edges, corners, contours, and brightness features) of a standard part and a non-standard part, and position and angle information that enables the capture of each feature. To improve the localization accuracy, there are usually a plurality of features, for example, more than 10 features, in one piece of landmark information. Therefore, a piece of landmark information usually contains features of a standard part and a non-standard part, or features of a non-standard part only. There are repeated and non-repeated features in adjacent landmark information normally. Here, a non-standard part refers to an object that is not pre-defined as a standard part, such as a table, chair, or wall. When localization information including feature of a standard part is obtained through the localization method in the present application, a localization error in the landmark information related to the standard part in the map data is compensated based on the obtained localization information.

For example, the built map data contains localization information of position C1 and position C2, where the position C1 contains landmark information t1, and the position C2 contains landmark information t2; and t1 contains features of standard parts and non-standard parts, and positions and angles where corresponding features are captured; t2 contains features of non-standard parts overlapping with t1, and positions and angles where corresponding features are captured. When the localization processing device identifies the standard part at the position C1 and determines current localization information D based on the identified standard part, the localization information D is used to replace localization information at the position C1 to compensate for a localization error in the original map data, and localization errors in the position and angle in the landmark information t1 are adjusted based on the localization information D. By using the features of the non-standard parts overlapped in the landmark information t1 and t2, localization errors in the position C2 and the landmark information t2 are also adjusted in this step.

It should be noted that the above method of error compensation for the localization information in the map data is only an example. As the errors of the mobile data and the image data are occurred through accumulation, the localization errors are not exactly the same. Therefore, for the localization compensation method, a weighted compensation method is also used to compensate for the localization errors in the map data.

In addition, localization information at one or more positions in the map data, and one or more types of localization errors at the same position are also adjusted in this step according to the localization information obtained by the localization method in the present application, and localization-related information that can be provided by the map data, such as localization information and landmark information.

Figure 4:
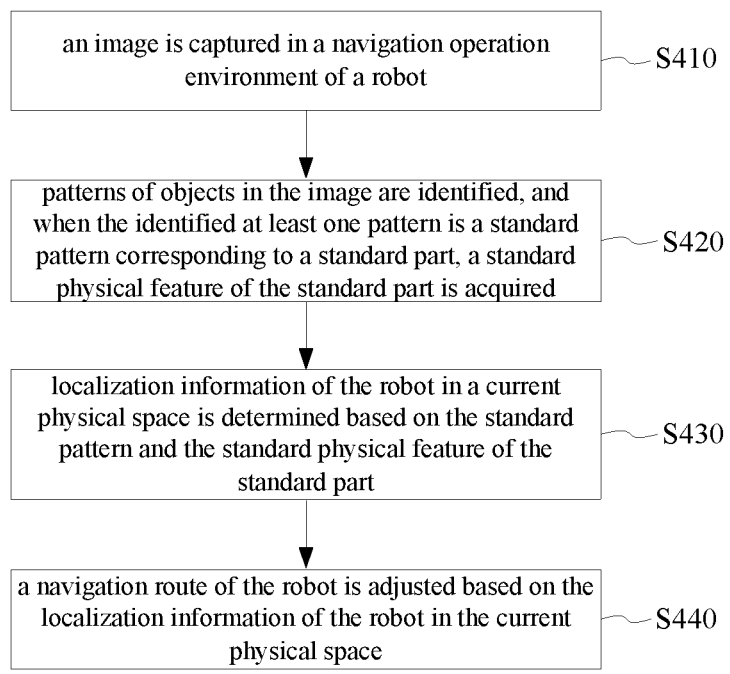
FIG. 4 shows a flow diagram of a localization method for a robot of the present application in yet another embodiment.

Please refer to FIG. 4, which shows a flow diagram of a localization method for a robot of the present application in yet another embodiment. As shown in the figure, the localization method for a robot of the present application includes: steps S410, S420, S430 and S440.

In step S410, an image is captured in a navigation operation environment of a robot.

Here, an image acquisition device is used to capture an image in the navigation operation environment of the robot. Step S410 is the same as or similar to step S110 in the foregoing example, and will not be described in detail here.

In step S420, patterns of objects in the image are identified, and when the identified at least one pattern is a standard pattern corresponding to a standard part, a standard physical feature of the standard part is acquired.

Here, a localization processing device is used to identify patterns of objects in the image, and when the identified at least one pattern is a standard pattern corresponding to a standard part, a standard physical feature of the standard part is acquired. Step S420 is same as or similar to step S120 in the foregoing example, and will not be described in detail here.

In step S430, localization information of the robot in a current physical space is determined based on the standard pattern and the standard physical feature of the standard part.

Here, the localization processing device is used to determine localization information of the robot in the current physical space based on the standard pattern and the standard physical feature of the standard part. Step S430 is same as or similar to step S130 in the foregoing example, and will not be described in detail here.

In step S440, a navigation route of the robot is adjusted based on the localization information of the robot in the current physical space.

Here, a control device of the robot is used to adjust a navigation route of the robot based on the localization information of the robot in the current physical space. The control device of the robot includes one or more processors (CPUs) or micro control units (MCUs) dedicated to the control of the robot. In addition, the processor in the control device and the processor in the above-mentioned localization processing device may be shared or provided independently. For example, the control device serves as a slave processing device, the processor in the localization processing device serves as a master device, and the control device controls the adjustment based on localization of the localization processing device. Alternatively, the processors in the control device and the processor in the localization device are a shared one.

Taking a cleaning robot as an example, the map data of the cleaning robot is generally built based on mobile data provided by a plurality of mobile sensors provided on the robot such as a speed sensor and an odometer sensor, and image data provided by the image acquisition device. Due to there are accumulated errors in the process of building a map using the mobile sensors and the image acquisition device, when the robot moves to a position, there is a deviation between the localization information of the robot in the current physical space determined through the localization method for a robot and the map data. Therefore, in the case of performing a navigation operation according to the built map, after determining the localization information of the robot in the current physical space, the localization processing device provides the localization information to the control device, and the control device adjusts a navigation route of the robot based on the localization information of the robot in the current physical space. In addition, the control device also adjusts a distance that the robot continues to move or adjusts a direction in which the robot moves according to the adjusted navigation route so that the robot moves according to the adjusted navigation route.

In the localization method for a robot of the present application, through a technical solution of identifying patterns of objects in a captured image and matching each pattern with a pattern of a standard part, and determining localization information of a robot in a current physical space based on a standard physical feature of the standard part, and adjusting a navigation route of the robot based on the localization information, the navigation route can be corrected under the condition of accurate localization.

In some embodiments, a manner of adjusting a navigation route of the robot based on the localization information of the robot in the current physical space in step S440 includes: re-determining a position and an orientation of the robot in a preset map data based on the localization information, and adjusting a navigation route based on the re-determined position and orientation.

Taking a cleaning robot as an example, in the case where the robot performs a navigation operation according to a built map, when the robot moves to a position, the position and orientation of the robot on the built map are known. And, the localization processing device determines localization information of the robot in the current physical space, that is, a current actual position and orientation of the robot, through the localization method for a robot of the present application. There are deviations between the current actual position and orientation of the robot and the position and orientation of the robot on the built map. The control device corrects the position and orientation of the robot on the built map based on the current actual position and orientation of the robot, i.e. re-determines the position and orientation of the robot in the built map. And, according to the re-determined position and orientation and the built map, the control device re-determines a distance from the robot to an obstacle, whether the robot is deviated from the navigation, and a required moving distance and deflection direction if the robot continues to move along the route in the built map, and then adjusts the navigation route.

Figure 5:
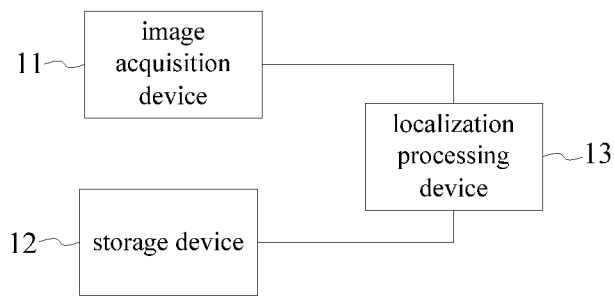
FIG. 5 shows a schematic diagram of a localization system for a robot of the present application in an embodiment.

The present application also provides a localization system for a robot, the localization system is configured in a cleaning robot. Please refer to FIG. 5, which shows a schematic diagram of a localization system for a robot of the present application in an embodiment. As shown in the figure, the localization system includes an image acquisition device 11, a storage device 12, and a localization processing device 13.

The image acquisition device 11 is configured to capture an image in a navigation operation environment of the robot. The image acquisition device includes but is not limited to: a camera, a video camera, an image acquisition module integrated with an optical system or a CCD chip, an image acquisition module integrated with an optical system and a CMOS chip, etc. A power supply system of the image acquisition device is controlled by a power supply system of the robot. When the robot is powered on and moves, the image acquisition device starts to capture images. In addition, the image acquisition device is positioned on a body of the robot. Taking a cleaning robot as an example, the image acquisition device is positioned in the middle or at an edge of a top cover of the cleaning robot, or the image acquisition device is positioned within a recessed structure beneath the plane of the top surface near a geometric center of the body or near an edge of the body. In addition, an angle between the optical axis of the image acquisition device and a vertical line is set as an angle of ±30°, or an angle between the optical axis of the image acquisition device and a horizontal line is set as an angle of 0-180°. The navigation operation environment refers to an environment in which the robot moves according to a navigation route designed based on map data or according to a randomly designed navigation route, and performs a corresponding operation. Taking a cleaning robot as an example, the navigation operating environment refers to an environment in which the cleaning robot moves according to a navigation route and performs a cleaning operation.

The storage device 12 is configured to pre-store a localization and mapping application, a behavior control application, and a standard physical feature of at least one standard part. The localization and mapping application, i.e. SLAM application is a basic application in the field of intelligent robots. The problem thereof is described as that when the robot is in an unknown environment, whether there is a way for the robot to gradually draw a complete map of the environment while determining which direction the robot should move. That is to say, three tasks need to be performed to achieve intelligence: a first task of localization, a second task of mapping, and a third task of subsequent route planning (navigation). The behavior control application in the present application includes controlling the robot to move and adjust pose according to the set information or instructions.

In addition, the storage device pre-stores a standard physical feature of each standard part. Wherein, the standard part includes a standard part designed based on at least one of industry standard, national standard, international standard, and custom standard. For example, the industry standard includes machinery industry standard JB, building materials industry standard JC, etc.; the national standard includes Chinese GB standard, German DIN standard, British BS standard, etc.; the international standard includes international ISO standard; and the custom standard will be detailed later. In addition, the standard physical feature includes overall dimension, standard structural relationship, etc. For example, the standard physical feature of the standard part includes the actual physical length, width and height of the standard part, other actual physical dimensional data of corresponding standard in the standard part, etc. An example is a distance between two holes of a power socket. Another example is the length and width of the power socket.

The storage device 12 includes but is not limited to a high-speed random access memory and a non-volatile memory. For example, one or more disk storage devices, flash memory devices, or other non-volatile solid-state storage devices. In some embodiments, the storage device 12 also includes a memory remote from one or more processors, such as a network attached storage accessed via an RF circuit or external port and a communication network (not shown), wherein the communication network includes the Internet, one or multiple intranets, local area networks (LANs), wide area networks (WLANs), storage area networks (SANs), etc., or a suitable combination thereof. The memory controller controls access to the storage device by other components such as a CPU and a peripheral interface of the robot.

The localization processing device 13 is connected with the image acquisition device 11 and the storage device 12. The localization processing device 13 includes one or more processors. The localization processing device 13 is operatively coupled with the volatile memory and/or non-volatile memory in the storage device 12. The localization processing device 13 executes instructions stored in the memory and/or non-volatile storage device to perform operations in the robot, such as identifying patterns of objects in an image, and performing localization in the map based on an identified standard pattern and standard physical features of a standard parts. As such, the processor includes one or more general purpose microprocessors, one or more dedicated processors (ASICs), one or more digital signal processors (DSPs), one or more field programmable logic arrays (FPGAs), or any combination thereof. The localization processing device is also operatively coupled with an I/O port and an input structure, wherein the I/O port enables the robot to interact with various other electronic devices, and the input structure enables a user to interact with a computing device. Thus, the input structure includes a button, a keyboard, a mouse, a touchpad, etc. The other electronic devices include but are not limited to: a mobile motor in a movement device in the robot, or a slave processor in the robot specially used for controlling the movement device and a cleaning device, such as an MCU (microcontroller unit, MCU for short).

In an example, the localization processing device 13 is connected with the storage device 12 and the image acquisition device 11 respectively through data cables. The localization processing device 13 interacts with the storage device 12 through data reading and writing technology, and the localization processing device 13 interacts with the image acquisition device 11 through an interface protocol. The data reading and writing technology includes but is not limited to: a high-speed/low-speed data interface protocol, a database read-write operation, and the like. The interface protocol includes but is not limited to: a HDMI interface protocol, a serial interface protocol, etc.

The localization processing device 13 is configured to invoke the localization and mapping application to perform operations of: identifying patterns of objects in the image, and when the identified at least one pattern is a standard pattern corresponding to a standard part, acquiring a standard physical feature of the standard part; and determining localization information of the robot in a current physical space based on the standard pattern and the standard physical feature of the standard part.

The localization processing device 13 processes, analyzes and understands the captured images through an image identification method such as a neural network-based image identification method or a wavelet-based image identification method so as to identify targets and objects in various modes. In addition, the localization processing device also finds similar image targets through analysis of corresponding relationship, similarity and consistency in image content, feature, structure, relationship, texture, and gray scale.

In an embodiment, taking a cleaning robot as an example. As the cleaning robot usually performs indoor cleaning work, objects in the images captured by the image acquisition device generally include, for example, wall, table, sofa, wardrobe, television, power socket, network cable socket, etc. In an example, first, the image acquisition device captures an image in the navigation operation environment of the robot, and then the image acquisition device provides the image to the localization processing device, and the localization processing device identifies patterns of objects in the captured image through image identification. The pattern of the object is characterized by the gray scale of the object, the contour of the object or other features of the object. Furthermore, the pattern of the object is not limited to an external geometric figure of the object, also includes other pattern presented on the object, such as a two-hole jack or a five-hole jack on a power socket, and a square jack on a network cable socket, etc. In view of this, for example, for a power socket and a network cable socket with similar external geometric figures, a five-hole jack of the power socket and a square jack of the network cable socket are used to distinguish therebetween. In addition, in the case where the object in the image captured by the image acquisition device of the cleaning robot indoors includes a power socket or a network cable socket, since the power socket and the network cable socket are designed according to the GB standard, the power socket and the network cable socket do not change depending on the environment where they located, the power socket and the network cable socket are used as standard parts. In this example, the standard part is a power socket. The standard physical features of the standard part include the length, width and height of the power socket, and a structural relationship of a five-hole jack on the power socket, and so on. In some embodiments, the pattern of the standard part and the standard physical feature of the standard part are preset, and pre-stored by a storage device of the robot. Therefore, a manner of acquiring the standard physical feature of the standard part includes reading a preset standard physical feature from the storage device of the robot.

In addition, with respect to the pattern of the object in the identified image and the stored pattern of the standard part such as the power socket, the localization processing device 13 determines whether the identified at least one pattern matches with the stored pattern of the power socket through analysis of corresponding relationship, similarity and consistency in image content, feature, structure, relationship, texture, or gray scale and so on, and when the identified at least one pattern matches with the stored pattern of the power socket, the standard physical feature of the power socket is acquired. The at least one pattern corresponding to the stored pattern of the power socket is named as a standard pattern. In this example, the standard pattern is the pattern of the captured power socket.

And then, according to a corresponding relationship between a preset unit pixel spacing and a unit length in the actual physical space, the size of the identified standard pattern and the real size of the corresponding standard physical feature, the localization processing device 13 calculates a distance and an angle of the robot relative to the standard part in the current physical space, to obtain the localization information of the robot relative to the standard part. Taking a socket positioned on a wall as an example, when the localization processing device identifies the socket and a boundary line between the wall and the ground, or identifies the socket and defaults to the installation of the socket on the wall, according to the above-mentioned corresponding relationship, the localization processing device not only obtains the distance and angle of the robot relative to the socket, but also obtains a straight-line distance between the robot and the wall according to a spatial positional relationships among the wall, the robot and the socket, thus the localization information of the robot relative to the wall is obtained.

In the localization system for a robot of present application, through a technical solution that the localization processing device 13 identifies patterns of objects in the image captured by the image acquisition device 11 and matches each pattern with a pattern of a standard part stored in the storage device 12, and determines localization information of a robot in a current physical space based on a standard physical feature of the standard part, the problem of inaccurate localization of the robot based on data provided by a sensor in the prior art can be solved.

Figure 6:
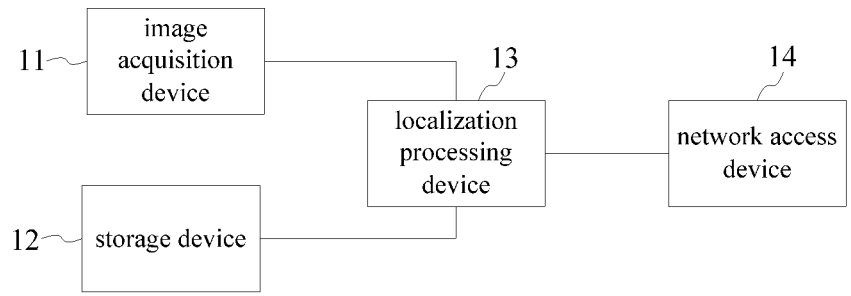
FIG. 6 shows a schematic diagram of a localization system for a robot of the present application in another embodiment.

Please refer to FIG. 6, which shows a schematic diagram of a localization system for a robot of the present application in another embodiment. As shown in the figure, the localization system further includes a network access device 14. The network access device 14 is connected with the localization processing device 13, and the network access device 14 is configured to acquire a corresponding standard physical feature from a remote server.

In an embodiment, the localization processing device provides a retrieval request, that is, a standard pattern, to a remote server through a network, and the remote server performs a retrieval through a CBIR (Content-based Image Retrieval, CBIR for short) method according to the request and determines a retrieval result, that is, a pattern of the standard part obtained by the retrieval, and then, the remote server outputs a standard physical feature of the standard part based on the acquired pattern of the standard part, and provides the standard physical feature to the localization processing device through the network for subsequent processing.

In some embodiments, in addition to a standard part designed based on at least one of industry standard, national standard, and international standard, the standard part also includes a standard part designed based on custom standard. The standard part designed based on custom standard is a standard part customized by a robot manufacturer, such as a standard part that is designed and manufactured by a robot manufacturer and is used with the robot in the operation environment of the robot. The standard part designed based on custom standard is a standard part with a standard physical feature generated based on physical parameters input by a user. In an embodiment, taking a cleaning robot as an example, the object in an image captured by an image acquisition device during operation of the cleaning robot in a living room generally includes household appliances such as a TV, so the user may design the TV as a standard part. Specifically, the user may obtain physical parameters of the TV through reading an instruction manual of the TV or product information, and input the physical parameters via an input device such as a robot application APP to generate a standard part with a standard physical feature. In addition, other objects may be chosen by the user as the standard part according to the indoor environment. The localization system for a robot of the present application uses the user-defined standard part, so that the standard part can be chosen by the user according to the indoor environment, which is helpful for accurate localization of the robot.

In some embodiments, a manner of determining localization information of the robot in a current physical space based on the standard pattern and the standard physical feature of the standard part by the localization processing device includes: performing an angle correction on the standard pattern based on the standard physical feature to obtain an angle of the robot relative to a plane where the standard part is located; and performing a distance measurement on the corrected pattern based on the standard physical feature to obtain a distance from the robot to the standard part and to the plane where the standard part is located.

Taking a standard part identified by the localization processing device being a two-hole power socket as an example, according to the size feature and angle feature of each hole in the standard physical features of the two-hole power socket, the actual physical spacing and angle features between the two holes, the pixel size and pixel angle of each hole in the standard pattern of the two-hole power socket identified in the image, and the pixel spacing and pixel angle between the two holes, the localization processing device determines an angle between a photographing surface of the image acquisition device and a plane where the two-hole power socket is located. The localization processing device obtains an angle of the robot relative to the plane where the standard part is located according to the obtained angle.

To facilitate the calculation of the distance from the robot to the standard part, the localization processing device corrects the standard pattern according to the obtained angle to obtain a standard pattern in the photographing surface parallel to the plane where the standard part is located. Then, distance measurement is performed according to a proportional relationship between the actual physical size and the pixel size of the standard pattern in the image, to obtain a distance between the robot and the standard part and a distance between the robot and the plane where the standard part is located.

After the angle of the robot relative to the plane where the standard part is located and the distances from the robot to the standard part and to the plane where the standard part is located are obtained, a current position and orientation of the robot are determined, that is, localization information of the robot in the current physical space is determined. The obtained localization information is used in navigation, mapping, map data correction and the like for the robot. Especially in indoor localization and mapping technology, the localization system in the present application can correct map data in time based on the localization information, so that indoor map data can be built and used as accurately as possible in a case that accurate indoor map data cannot be obtained in advance.

In some embodiments, the localization processing device is further configured to perform a step of adjusting map data in the robot based on the localization information of the robot in the current physical space.

Taking a cleaning robot as an example, the map data of the cleaning robot is generally built based on mobile data provided by a plurality of mobile sensors provided on the robot such as speed sensor, an odometer sensor, a ranging sensor, and a cliff sensor, as well as image data provided by the image acquisition device. Due to there are accumulated errors in the process of building a map using the mobile sensors and the image acquisition device, when the robot moves to a position, there is a deviation between the localization information of the robot in the current physical space determined by the localization system for a robot and the map data, and thus the map data is required to be adjusted. Here, after determining the localization information of the robot in the current physical space, the localization processing device adjusts the map data in the robot based on the localization information. The map data includes but is not limited to, position and angle data described in a preset grid or coordinate space based on the mobile data provided by the mobile sensors and the image data, and landmark information marked in the preset grid or coordinate space based on identified object features, etc. The map data is used for map building and navigation.

In the localization system for a robot of the present application, through a technical solution that the localization processing device identifies patterns of objects in an image captured by the image acquisition device and matches each pattern with a pattern of a standard part stored in the storage device, and determines localization information of a robot in a current physical space based on a standard physical feature of the standard part, and adjusts map data in the robot based on the localization information, a localization error in the map data can be compensated according to the localization information and the accurate localization can be achieved.

In some embodiments, a manner of adjusting map data in the robot based on the localization information of the robot in the current physical space by the localization processing device includes: compensating for a localization error of a corresponding position in the map data based on the localization information; and/or compensating for a localization error in landmark information related to the standard part in the map data based on the localization information.

In a specific example, when the robot does not identify the standard part, it builds map data according to the mobile data provided by the mobile sensors. When the robot identifies the standard part, and determines the localization information of the robot in the current physical space based on the identified standard pattern and the standard physical feature of the corresponding standard part, the localization processing device compares the localization information and a localization information determined based on the mobile data to determine whether there are a position and angle deviation, and if so, the localization information determined based on the mobile data may be replaced with the localization information of the standard part, and other map data is corrected based on the position and angle deviation between the two types of localization information. For example, please refer to FIG. 3, which shows a schematic diagram of compensating for localization errors of position A1 and position A2 in the map data according to localization information B determined through the localization method in the present application. The position A1 and position A2 are localization information determined based on the mobile data. When the localization processing device identifies a standard part at the position A2 and determines the current localization information B based on the identified standard part, it replaces the position A2 with the localization information B, and as the localization information B is on the left of A2 with a deviation of one grid, the localization information of A1 is also adjusted to the left by one grid to obtain A1' as denoted by a dotted line to compensate for the localization error of the mobile data at the position A1.

In another specific example, when localization is performed based on images and map data is built according to this image localization, the map data includes landmark information. The landmark information is used to assist the robot to be localized based on images. The landmark information includes but is not limited to: features (such as edges, corners, contours, and brightness features) of a standard part and a non-standard part, and position and angle information that enables the capture of each feature. To improve the localization accuracy, there are usually a plurality of features, for example, more than 10 features, in one piece of landmark information. Therefore, a piece of landmark information usually contains features of a standard part and a non-standard part, or features of a non-standard part only. There are repeated and non-repeated features in adjacent landmark information normally. Here, a non-standard part refers to an object that is not pre-defined as a standard part, such as a table, chair, or wall. When localization information including feature of a standard part is obtained by the localization system in the present application, a localization error in the landmark information related to the standard part in the map data is compensated based on the obtained localization information.

For example, the built map data contains localization information of position C1 and position C2, where the position C1 contains landmark information t1, and the position C2 contains landmark information t2; and t1 contains features of standard parts and non-standard parts, and positions and angles where corresponding features are captured; t2 contains features of non-standard parts overlapping with t1, and positions and angles where corresponding features are captured. When the localization processing device identifies the standard part at the position C1 and determines current localization information D based on the identified standard part, the localization information D is used to replace localization information at the position C1 to compensate for a localization error in the original map data, and localization errors in the position and angle in the landmark information t1 are adjusted based on the localization information D. By using the features of the non-standard parts overlapped in the landmark information t1 and t2, localization errors in the position C2 and the landmark information t2 are also adjusted in this step.

It should be noted that the above method of error compensation for the localization information in the map data is only an example. As the errors of the mobile data and the image data are occurred through accumulation, the localization errors are not exactly the same. Therefore, for the localization compensation method, a weighted compensation method is also used to compensate for the localization errors in the map data.

In addition, localization information at one or more positions in the map data, and one or more types of localization errors at the same position are also adjusted in this step according to the localization information obtained by the localization system in the present application, and localization-related information that can be provided by the map data, such as localization information and landmark information.

In some embodiments, the localization processing device is further configured to adjust a navigation route of the robot based on the localization information of the robot in the current physical space.

Taking a cleaning robot as an example, the map data of the cleaning robot is generally built based on mobile data provided by a plurality of mobile sensors provided on the robot such as a speed sensor and an odometer sensor, and image data provided by the image acquisition device. Due to there are accumulated errors in the process of building a map using the mobile sensors and the image acquisition device, when the robot moves to a position, there is a deviation between the localization information of the robot in the current physical space determined by the localization system for a robot and the map data. Therefore, in the case of performing a navigation operation according to the built map, after determining the localization information of the robot in the current physical space, the localization processing device adjusts a navigation route of the robot based on the localization information of the robot in the current physical space. In addition, the localization processing device also adjusts a distance that the robot continues to move or adjusts a direction in which the robot moves according to the adjusted navigation route so that the robot moves according to the adjusted navigation route.

In the localization system for a robot of the present application, through a technical solution of identifying patterns of objects in a captured image and matching each pattern with a pattern of a standard part, and determining localization information of a robot in a current physical space based on a standard physical feature of the standard part, and adjusting a navigation route of the robot based on the localization information, the navigation route can be corrected under the condition of accurate localization.

In some embodiments, a manner of adjusting a navigation route of the robot based on the localization information of the robot in the current physical space by the localization processing device includes: re-determining a position and an orientation of the robot in a preset map data based on the localization information, and adjusting a navigation route based on the re-determined position and orientation.

In an embodiment, taking a cleaning robot as an example, in the case where the robot performs a navigation operation according to a built map, when the robot moves to a position, the position and orientation of the robot on the built map are known. And, the localization processing device in the localization system for a robot of the present application determines localization information of the robot in the current physical space, that is, a current actual position and orientation of the robot. There are deviations between the current actual position and orientation of the robot and the position and orientation of the robot on the built map. The localization processing device corrects the position and orientation of the robot on the built map based on the current actual position and orientation of the robot, i.e. re-determines the position and orientation of the robot in the built map. And, according to the re-determined position and orientation and the built map, the control device re-determines a distance from the robot to an obstacle, whether the robot is deviated from the navigation, and a required moving distance and deflection direction if the robot continues to move along the route in the built map, and then adjusts the navigation route.

Figure 7:
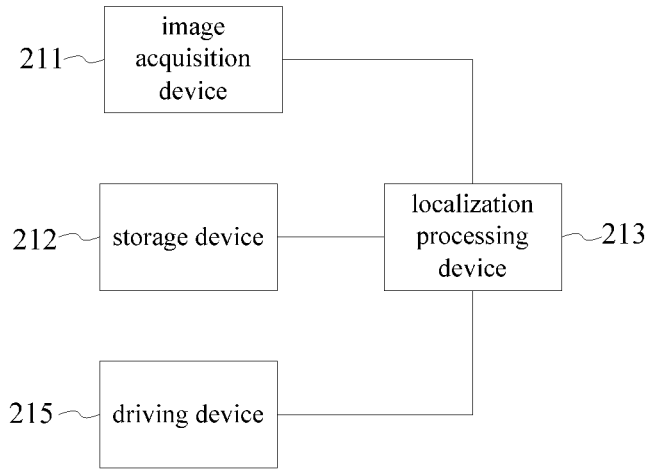
FIG. 7 shows a schematic diagram of a robot of the present application in an embodiment.

The present application also provides a robot. Please refer to FIG. 7, which shows a schematic diagram of the robot of the present application in an embodiment. As shown in the figure, the robot includes a driving device 215, an image acquisition device 211, a storage device 212, and a localization processing device 213.

The driving device 215 is configured to drive the robot to perform displacement and/or pose adjustment. Taking a cleaning robot as an example, the driving device is a driving motor that drives wheels of the cleaning robot to move and deflect, or the like.

The image acquisition device 211 is used to capture an image in the navigation operation environment of the robot. The image acquisition device includes but is not limited to: a camera, a video camera, an image acquisition module integrated with an optical system or a CCD chip, an image acquisition module integrated with an optical system and a CMOS chip, etc. A power supply system of the image acquisition device is controlled by a power supply system of the robot. When the robot is powered on and moves, the image acquisition device starts to capture images. In addition, the image acquisition device is positioned on a body of the robot. Taking a cleaning robot as an example, the image acquisition device is positioned in the middle or at an edge of a top cover of the cleaning robot, or the image acquisition device is positioned within a recessed structure beneath the plane of the top surface near a geometric center of the body or near an edge of the body. In addition, an angle between the optical axis of the image acquisition device and a vertical line is set as an angle of ±30°, or an angle between the optical axis of the image acquisition device and a horizontal line is set as an angle of 0-180°. The navigation operation environment refers to an environment in which the robot moves according to a navigation route designed based on map data or according to a randomly designed navigation route, and performs a corresponding operation. Taking a cleaning robot as an example, the navigation operating environment refers to an environment in which the cleaning robot moves according to a navigation route and performs a cleaning operation.

The storage device 212 is configured to pre-store a localization and mapping application, a behavior control application, and a standard physical feature of at least one standard part. The localization and mapping application, i.e. SLAM application is a basic application in the field of intelligent robots. The problem thereof is described as that when the robot is in an unknown environment, whether there is a way for the robot to gradually draw a complete map of the environment while determining which direction the robot should move. That is to say, three tasks need to be performed to achieve intelligence: a first task of localization, a second task of mapping, and a third task of subsequent route planning (navigation). The behavior control application in the present application includes controlling the robot to move and adjust pose according to the set information or instructions.

In addition, the storage device pre-stores a standard physical feature of each standard part. Wherein, the standard part includes a standard part designed based on at least one of industry standard, national standard, international standard, and custom standard. For example, the industry standard includes machinery industry standard JB, building materials industry standard JC, etc.; the national standard includes Chinese GB standard, German DIN standard, British BS standard, etc.; the international standard includes international ISO standard; and the custom standard will be detailed later. In addition, the standard physical feature includes overall dimension, standard structural relationship, etc. For example, the standard physical feature of the standard part includes the actual physical length, width and height of the standard part, other actual physical dimensional data of corresponding standard in the standard part, etc. An example is a distance between two holes of a power socket. Another example is the length and width of the power socket.

The storage device 212 includes but is not limited to a high-speed random access memory and a non-volatile memory. For example, one or more disk storage devices, flash memory devices, or other non-volatile solid-state storage devices. In some embodiments, the storage device 212 also includes a memory remote from one or more processors, such as a network attached storage accessed via an RF circuit or external port and a communication network (not shown), wherein the communication network includes the Internet, one or multiple intranets, local area networks (LANs), wide area networks (WLANs), storage area networks (SANs), etc., or a suitable combination thereof. The memory controller controls access to the storage device by other components such as a CPU and a peripheral interface of the robot.

The localization processing device 213 is connected with the driving device 215, the image acquisition device 211 and the storage device 212. The localization processing device 213 includes one or more processors. The localization processing device 213 is operatively coupled with the volatile memory and/or non-volatile memory in the storage device 212. The localization processing device 213 executes instructions stored in the memory and/or non-volatile storage device to perform operations in the robot, such as identifying patterns of objects in an image, and performing localization in the map based on an identified standard pattern and standard physical features of a standard parts. As such, the processor includes one or more general purpose microprocessors, one or more dedicated processors (ASICs), one or more digital signal processors (DSPs), one or more field programmable logic arrays (FPGAs), or any combination thereof. The localization processing device is also operatively coupled with an I/O port and an input structure, wherein the I/O port enables the robot to interact with various other electronic devices, and the input structure enables a user to interact with a computing device. Thus, the input structure includes a button, a keyboard, a mouse, a touchpad, etc. The other electronic devices include but are not limited to: a mobile motor in a movement device in the robot, or a slave processor in the robot specially used for controlling the movement device and a cleaning device, such as an MCU (microcontroller unit, MCU for short).

In an example, the localization processing device 213 is connected with the storage device 212, the image acquisition device 211 and the driving device 215 respectively through data cables. The localization processing device 213 interacts with the storage device 212 through data reading and writing technology, and the localization processing device 213 interacts with the image acquisition device 211 and the driving device 215 through an interface protocol. The data reading and writing technology includes but is not limited to: a high-speed/low-speed data interface protocol, a database read-write operation, and the like. The interface protocol includes but is not limited to: a HDMI interface protocol, a serial interface protocol, etc.

The localization processing device 213 is configured to invoke the prestored localization and mapping application to perform operations of: identifying patterns of objects in the image, and when the identified at least one pattern is a standard pattern corresponding to a standard part, acquiring a standard physical feature of the standard part; and determining localization information of the robot in a current physical space based on the standard pattern and the standard physical feature of the standard part.

The localization processing device 213 processes, analyzes and understands the captured images through an image identification method such as a neural network-based image identification method or a wavelet-based image identification method so as to identify targets and objects in various modes. In addition, the localization processing device also finds similar image targets through analysis of corresponding relationship, similarity and consistency in image content, feature, structure, relationship, texture, and gray scale.

In an embodiment, taking a cleaning robot as an example. As the cleaning robot usually performs indoor cleaning work, objects in the images captured by the image acquisition device generally include, for example, wall, table, sofa, wardrobe, television, power socket, network cable socket, etc. In an example, first, the image acquisition device captures an image in the navigation operation environment of the robot, and then the image acquisition device provides the image to the localization processing device, and the localization processing device identifies patterns of objects in the captured image through image identification. The pattern of the object is characterized by the gray scale of the object, the contour of the object or other features of the object. Furthermore, the pattern of the object is not limited to an external geometric figure of the object, also includes other pattern presented on the object, such as a two-hole jack or a five-hole jack on a power socket, and a square jack on a network cable socket, etc. In view of this, for example, for a power socket and a network cable socket with similar external geometric figures, a five-hole jack of the power socket and a square jack of the network cable socket are used to distinguish therebetween. In addition, in the case where the object in the image captured by the image acquisition device of the cleaning robot indoors includes a power socket or a network cable socket, since the power socket and the network cable socket are designed according to the GB standard, the power socket and the network cable socket do not change depending on the environment where they located, the power socket and the network cable socket are used as standard parts. In this example, the standard part is a power socket. The standard physical features of the standard part include the length, width and height of the power socket, and a structural relationship of a five-hole jack on the power socket, and so on. In some embodiments, the pattern of the standard part and the standard physical feature of the standard part are preset, and pre-stored by a storage device of the robot. Therefore, a manner of acquiring the standard physical feature of the standard part includes reading a preset standard physical feature from the storage device of the robot.

In addition, with respect to the pattern of the object in the identified image and the stored pattern of the standard part such as the power socket, the localization processing device 213 determines whether the identified at least one pattern matches with the stored pattern of the power socket through analysis of corresponding relationship, similarity and consistency in image content, feature, structure, relationship, texture, or gray scale and so on, and when the identified at least one pattern matches with the stored pattern of the power socket, the standard physical feature of the power socket is acquired. The at least one pattern corresponding to the stored pattern of the power socket is named as a standard pattern. In this example, the standard pattern is the pattern of the captured power socket.

And then, according to a corresponding relationship between a preset unit pixel spacing and a unit length in the actual physical space, the size of the identified standard pattern and the real size of the corresponding standard physical feature, the localization processing device 213 calculates a distance and an angle of the robot relative to the standard part in the current physical space, to obtain the localization information of the robot relative to the standard part. Taking a socket positioned on a wall as an example, when the localization processing device identifies the socket and a boundary line between the wall and the ground, or identifies the socket and defaults to the installation of the socket on the wall, according to the above-mentioned corresponding relationship, the localization processing device not only obtains the distance and angle of the robot relative to the socket, but also obtains a straight-line distance between the robot and the wall according to a spatial positional relationships among the wall, the robot and the socket, thus the localization information of the robot relative to the wall is obtained.

In the localization system for a robot of present application, through a technical solution that the localization processing device 213 identifies patterns of objects in the image captured by the image acquisition device 211 and matches each pattern with a pattern of a standard part stored in the storage device 212, and determines localization information of a robot in a current physical space based on a standard physical feature of the standard part, the problem of inaccurate localization of the robot based on data provided by a sensor in the prior art can be solved.

Figure 8:
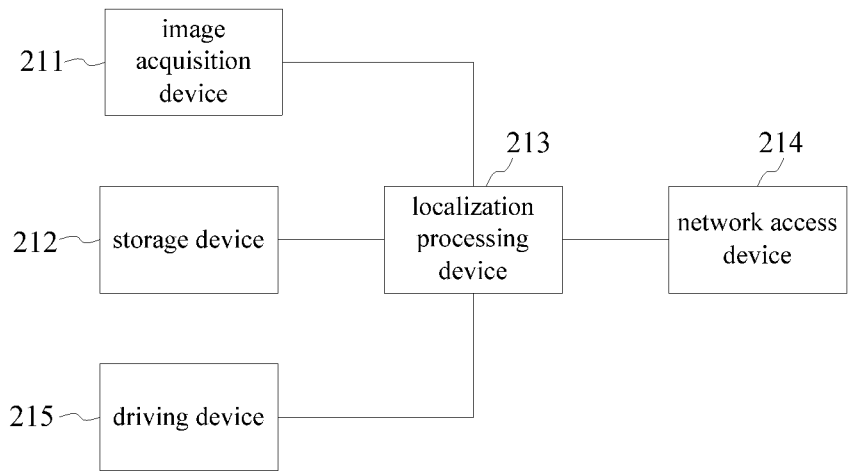
FIG. 8 shows a schematic diagram of a robot of the present application in another embodiment.

Please refer to FIG. 8, which shows a schematic diagram of a robot of the present application in another embodiment. As shown in the figure, the robot also includes a network access device 214. The network access device 214 is connected with the localization processing device 213, and the network access device 214 is configured to acquire a corresponding standard physical feature from a remote server.

In an embodiment, the localization processing device provides a retrieval request, that is, a standard pattern, to a remote server through a network, and the remote server performs a retrieval through a CBIR (Content-based Image Retrieval, CBIR for short) method according to the request and determines a retrieval result, that is, a pattern of the standard part obtained by the retrieval, and then, the remote server outputs a standard physical feature of the standard part based on the acquired pattern of the standard part, and provides the standard physical feature to the localization processing device through the network for subsequent processing.

In some embodiments, in addition to a standard part designed based on at least one of industry standard, national standard, and international standard, the standard part also includes a standard part designed based on custom standard. The standard part designed based on custom standard is a standard part customized by a robot manufacturer, such as a standard part that is designed and manufactured by a robot manufacturer and is used with the robot in the operation environment of the robot. The standard part designed based on custom standard is a standard part with a standard physical feature generated based on physical parameters input by a user. In an embodiment, taking a cleaning robot as an example, the object in an image captured by an image acquisition device during operation of the cleaning robot in a living room generally includes household appliances such as a TV, so the user may design the TV as a standard part. Specifically, the user may obtain physical parameters of the TV through reading an instruction manual of the TV or product information, and input the physical parameters via an input device such as a robot application APP to generate a standard part with a standard physical feature. In addition, other objects may be chosen by the user as the standard part according to the indoor environment. The robot of the present application uses the user-defined standard part, so that the standard part can be chosen by the user according to the indoor environment, which is helpful for accurate localization of the robot.

In some embodiments, a manner of determining localization information of the robot in a current physical space based on the standard pattern and the standard physical feature of the standard part by the localization processing device includes: performing an angle correction on the standard pattern based on the standard physical feature to obtain an angle of the robot relative to a plane where the standard part is located; and performing a distance measurement on the corrected pattern based on the standard physical feature to obtain a distance from the robot to the standard part and to the plane where the standard part is located.

Taking a standard part identified by the localization processing device being a two-hole power socket as an example, according to the size feature and angle feature of each hole in the standard physical features of the two-hole power socket, the actual physical spacing and angle features between the two holes, the pixel size and pixel angle of each hole in the standard pattern of the two-hole power socket identified in the image, and the pixel spacing and pixel angle between the two holes, the localization processing device determines an angle between a photographing surface of the image acquisition device and a plane where the two-hole power socket is located. The localization processing device obtains an angle of the robot relative to the plane where the standard part is located according to the obtained angle.

To facilitate the calculation of the distance from the robot to the standard part, the localization processing device corrects the standard pattern according to the obtained angle to obtain a standard pattern in the photographing surface parallel to the plane where the standard part is located. Then, distance measurement is performed according to a proportional relationship between the actual physical size and the pixel size of the standard pattern in the image, to obtain a distance between the robot and the standard part and a distance between the robot and the plane where the standard part is located.

After the angle of the robot relative to the plane where the standard part is located and the distances from the robot to the standard part and to the plane where the standard part is located are obtained, a current position and orientation of the robot are determined, that is, localization information of the robot in the current physical space is determined. The obtained localization information is used in navigation, mapping, map data correction and the like for the robot. Especially in indoor localization and mapping technology, the robot in the present application can correct map data in time based on the localization information, so that indoor map data can be built and used as accurately as possible in a case that accurate indoor map data cannot be obtained in advance.

In some embodiments, the localization processing device is further configured to invoke the the localization and mapping application to perform a step of adjusting map data in the robot based on the localization information of the robot in the current physical space.

Taking a cleaning robot as an example, the map data of the cleaning robot is generally built based on mobile data provided by a plurality of mobile sensors provided on the robot such as speed sensor, an odometer sensor, a ranging sensor, and a cliff sensor, as well as image data provided by the image acquisition device. Due to there are accumulated errors in the process of building a map using the mobile sensors and the image acquisition device, when the robot moves to a position, there is a deviation between the localization information of the robot in the current physical space determined by the robot and the map data, and thus the map data is required to be adjusted. Here, after determining the localization information of the robot in the current physical space, the localization processing device adjusts the map data in the robot based on the localization information. The map data includes but is not limited to, position and angle data described in a preset grid or coordinate space based on the mobile data provided by the mobile sensors and the image data, and landmark information marked in the preset grid or coordinate space based on identified object features, etc. The map data is used for map building and navigation.

In the robot of the present application, through a technical solution that the localization processing device identifies patterns of objects in an image captured by the image acquisition device and matches each pattern with a pattern of a standard part stored in the storage device, and determines localization information of a robot in a current physical space based on a standard physical feature of the standard part, and adjusts map data in the robot based on the localization information, a localization error in the map data can be compensated according to the localization information and the accurate localization can be achieved.

In some embodiments, a manner of adjusting map data in the robot based on the localization information of the robot in the current physical space by the localization processing device includes: compensating for a localization error of a corresponding position in the map data based on the localization information; and/or compensating for a localization error in landmark information related to the standard part in the map data based on the localization information.

In a specific example, when the robot does not identify the standard part, it builds map data according to the mobile data provided by the mobile sensors. When the robot identifies the standard part, and determines the localization information of the robot in the current physical space based on the identified standard pattern and the standard physical feature of the corresponding standard part, the localization processing device compares the localization information and a localization information determined based on the mobile data to determine whether there are a position and angle deviation, and if so, the localization information determined based on the mobile data may be replaced with the localization information of the standard part, and other map data is corrected based on the position and angle deviation between the two types of localization information. For example, please refer to FIG. 3, which shows a schematic diagram of compensating for localization errors of position A1 and position A2 in the map data according to localization information B determined through the localization method in the present application. The position A1 and position A2 are localization information determined based on the mobile data. When the localization processing device identifies a standard part at the position A2 and determines the current localization information B based on the identified standard part, it replaces the position A2 with the localization information B, and as the localization information B is on the left of A2 with a deviation of one grid, the localization information of A1 is also adjusted to the left by one grid to obtain A1' as denoted by a dotted line to compensate for the localization error of the mobile data at the position A1.

In another specific example, when localization is performed based on images and map data is built according to this image localization, the map data includes landmark information. The landmark information is used to assist the robot to be localized based on images. The landmark information includes but is not limited to: features (such as edges, corners, contours, and brightness features) of a standard part and a non-standard part, and position and angle information that enables the capture of each feature. To improve the localization accuracy, there are usually a plurality of features, for example, more than 10 features, in one piece of landmark information. Therefore, a piece of landmark information usually contains features of a standard part and a non-standard part, or features of a non-standard part only. There are repeated and non-repeated features in adjacent landmark information normally. Here, a non-standard part refers to an object that is not pre-defined as a standard part, such as a table, chair, or wall. When localization information including feature of a standard part is obtained by the robot in the present application, a localization error in the landmark information related to the standard part in the map data is compensated based on the obtained localization information.

For example, the built map data contains localization information of position C1 and position C2, where the position C1 contains landmark information t1, and the position C2 contains landmark information t2; and t1 contains features of standard parts and non-standard parts, and positions and angles where corresponding features are captured; t2 contains features of non-standard parts overlapping with t1, and positions and angles where corresponding features are captured. When the localization processing device identifies the standard part at the position C1 and determines current localization information D based on the identified standard part, the localization information D is used to replace localization information at the position C1 to compensate for a localization error in the original map data, and localization errors in the position and angle in the landmark information t1 are adjusted based on the localization information D. By using the features of the non-standard parts overlapped in the landmark information t1 and t2, localization errors in the position C2 and the landmark information t2 are also adjusted in this step.

It should be noted that the above method of error compensation for the localization information in the map data is only an example. As the errors of the mobile data and the image data are occurred through accumulation, the localization errors are not exactly the same. Therefore, for the localization compensation method, a weighted compensation method is also used to compensate for the localization errors in the map data.

In addition, localization information at one or more positions in the map data, and one or more types of localization errors at the same position are also adjusted in this step according to the localization information obtained by the robot in the present application, and localization-related information that can be provided by the map data, such as localization information and landmark information.

In some embodiments, the localization processing device is further configured to invoke the behavior control application to perform a step of controlling the driving device to adjust displacement and/or pose of the robot according to the localization information.

Wherein, the localization processing device may only drive the robot to perform the displacement adjustment, or may only drive the robot to perform the pose adjustment, or drive the robot to perform both displacement adjustment and pose adjustment, which depends on a relationship between localization information of the robot in the current physical space and localization information in the built map. For example, the localization processing device controls the rotation direction and speed of the drive motor in the driving device according to the localization information. As another example, the robot includes two sets of driving motors corresponding to each set of wheels, and the localization processing device controls each driving motor to drive the corresponding wheel with the same rotation direction and different rotation speed according to the localization information, so that the robot changes the moving direction.

In some embodiments, a manner of driving the robot to adjust displacement and/or pose according to the localization information by the localization processing device comprises: adjusting a navigation route of the robot based on the localization information of the robot in the current physical space; controlling the driving device to perform displacement and/or pose adjustment according to the navigation route.

In an embodiment, the localization processing device is further configured to adjust a navigation route of the robot based on the localization information of the robot in the current physical space. Taking a cleaning robot as an example, the map data of the cleaning robot is generally built based on mobile data provided by a plurality of mobile sensors provided on the robot such as a speed sensor and an odometer sensor, and image data provided by the image acquisition device. Due to there are accumulated errors in the process of building a map using the mobile sensors and the image acquisition device, when the robot moves to a position, there is a deviation between the localization information of the robot in the current physical space determined by the robot and the map data. Therefore, in the case of performing a navigation operation according to the built map, after determining the localization information of the robot in the current physical space, the localization processing device adjusts a navigation route of the robot based on the localization information of the robot in the current physical space.

Then, the localization processing device controls the driving device to perform displacement and/or pose adjustment based on the navigation route. That is, the localization processing device adjusts a distance that the robot continues to move or adjusts a direction in which the robot moves to control the movement of the driving device according to the adjusted navigation route.

In the robot of the present application, through a technical solution of identifying patterns of objects in a captured image and matching each pattern with a pattern of a standard part, and determining localization information of a robot in a current physical space based on a standard physical feature of the standard part, and adjusting displacement and/or pose of the robot based on the localization information, the navigation route can be corrected and the displacement and pose of the robot can be adjusted so as to move according to the new navigation route meanwhile maintaining the accurate localization for the robot.

In some embodiments, a manner of adjusting a navigation route of the robot based on the localization information of the robot in the current physical space by the localization processing device includes: re-determining a position and an orientation of the robot in a preset map data based on the localization information, and adjusting a navigation route based on the re-determined position and orientation.

Taking a cleaning robot as an example, in the case where the robot performs a navigation operation according to a built map, when the robot moves to a position, the position and orientation of the robot on the built map are known. And, the robot of the present application determines localization information of the robot in the current physical space, that is, a current actual position and orientation of the robot. There are deviations between the current actual position and orientation of the robot and the position and orientation of the robot on the built map. The localization processing device corrects the position and orientation of the robot on the built map based on the current actual position and orientation of the robot, i.e. re-determines the position and orientation of the robot in the built map. And, according to the re-determined position and orientation and the built map, the control device re-determines a distance from the robot to an obstacle, whether the robot is deviated from the navigation, and a required moving distance and deflection direction if the robot continues to move along the route in the built map, and then adjusts the navigation route.

It should be noted that, through the description of the above implementations, those skilled in the art can clearly understand that part or all of the present application can be realized by means of software and in combination with necessary general-purpose hardware platforms. Based on this, the present application further provides a storage medium of an electronic device, the storage medium stores one or more programs, and when the one or more programs are executed by one or more processors, the one or more processors implement the localization method mentioned above.

Based on this understanding, the technical solutions of the present application essentially or the part contributing to the prior art can be embodied in the form of a software product, the computer software product can include one or more machine readable media which store machine executable instructions thereon, when these instructions are executed by one or more machines such as a computer, a computer network or other electronic apparatus, such one or more machines can execute operations based on the embodiments of the present application, for example, executing each step in the control method of the mobile robot, etc. The machine readable media include but are not limited to, a floppy disk, an optical disk, a CD-ROM (a compact disc-read only memory), a magnetic optical disc, an ROM (read-only memory), an RAM (random access memory), an EPROM (erasable programmable read-only memory), an EEPROM (electrically erasable programmable read-only memory), a magnetic card or optical card, a flash memory, or other types of media/machine readable media suitable for storing machine executable instructions. Wherein the storage media can be located in the mobile robot and can also be located in a third-party server, for example, in a server providing a certain application store. Specific application stores are not limited herein, and can be a MIUI application store, a Huawei application store, and an Apple application store, etc.

The application can be used in numerous general-purpose or special-purpose calculating system environments or configurations, for example, personal computer, server computer, handheld device or portable device, tablet device, multiprocessor system, microprocessor based system, set top box, programmable consumer electronic device, network PC, small-size computer, large-scale computer, and a distributed computing environment containing any of the above system or device.

The present application can be described in the general context of the computer executable instructions executed by the computer, such as a program module. Generally, the program module includes routines, programs, objects, components, data structures and the like which execute particular tasks or realize particular abstract data types. The present application can also be practiced in the distributed computing environments. In these distributed computing environments, tasks are executed by remote processing devices which are connected via a communication network. In the distributed computing environments, the program module can be located in a local and remote computer storage medium including a storage device.

While the above embodiments have been shown and described herein, it will be obvious to those skilled in the art that such embodiments are provided by way of example only, and are not intended to limit the application. Numerous variations, changes, and substitutions will now occur to those skilled in the art without departing from the present application. Therefore, all equivalent modifications or changes made by those skilled in the art without departing from the spirit and scope of the application will be covered by the claims.

The invention claimed is:

1. A localization method for a robot, comprising:
capturing an image in a navigation operation environment of the robot, the navigation operation environment is based on a map built through SLAM or VSLAM;
identifying patterns of objects in the image, and when the identified at least one pattern is a standard pattern corresponding to a standard part, acquiring a standard physical feature of the standard part; and
determining localization information of the robot in a current physical space based on the standard physical feature of the standard part and the standard pattern, including:
performing an angle correction on the standard pattern based on the standard physical feature to obtain an angle of the robot relative to a plane where the standard part is located;
performing a distance measurement on the corrected pattern based on the standard physical feature to obtain a distance between the robot and the standard part and a distance between the robot and the plane where the standard part is located;
wherein, the standard part comprises a standard part designed based on at least one of industry standard, national standard, and international standard.

2. The localization method for a robot of claim 1, wherein, a manner of acquiring a standard physical feature of the standard part comprises:
reading a preset standard physical feature from a storage device of the robot; or
acquiring the standard physical feature from a remote server through a network.

3. The localization method for a robot of claim 1, wherein, the standard part further comprises a standard part designed based on custom standard.

4. The localization method for a robot of claim 1, further comprising adjusting map data in the robot based on the localization information of the robot in the current physical space.

5. The localization method for a robot of claim 4, wherein, a manner of adjusting map data in the robot based on the localization information of the robot in the current physical space comprises:
compensating for a localization error of a corresponding position in the map data based on the localization information; and/or
compensating for a localization error in landmark information related to the standard part in the map data based on the localization information.

6. The localization method for a robot of claim 1, further comprising adjusting a navigation route of the robot based on the localization information of the robot in the current physical space.

7. The localization method for a robot of claim 6, wherein, a manner of adjusting a navigation route of the robot based on the localization information of the robot in the current physical space comprises:
re-determining a position and an orientation of the robot in a preset map data based on the localization information, and adjusting a navigation route based on the re-determined position and orientation.

8. A robot, comprising:
a driving device, configured to drive the robot to perform displacement and/or pose adjustment;
an image acquisition device, configured to capture an image in a navigation operation environment of the robot, the navigation operation environment is based on a map built through SLAM or VSLAM;
a storage device, configured to pre-store a localization and mapping application and a behavior control application, and a standard physical feature of at least one standard part;
wherein, the localization and mapping application contains the map built through SLAM or VSLAM;
a localization processing device, connected with the driving device, the image acquisition device and the storage device, and configured to invoke the pre-stored localization and mapping application in the navigation operation environment to perform the following steps:
identifying patterns of objects in the image, and when the identified at least one pattern is a standard pattern corresponding to a standard part, acquiring a standard physical feature of the standard part; and
determining localization information of the robot in a current physical space based on the standard pattern and the standard physical feature of the standard part, including performing an angle correction on the standard pattern based on the standard physical feature to obtain an angle of the robot relative to a plane where the standard part is located; performing a distance measurement on the corrected pattern based on the standard physical feature to obtain a distance between the robot and the standard part and a distance between the robot and the plane where the standard part is located;
wherein, the standard part comprises a standard part designed based on at least one of industry standard, national standard, and international standard.

9. The robot of claim 8, wherein, the storage device is further configured to pre-store a standard physical feature of each standard part.

10. The robot of claim 8, further comprising a network access device, the network access device is connected with the localization processing device and configured to acquire a corresponding standard physical feature from a remote server.

11. The robot of claim 8, wherein, the standard part further comprises a standard part with a standard physical feature generated based on physical parameters input by a user.

12. The robot of claim 8, wherein, the localization processing device is further configured to invoke the localization and mapping application to perform a step of adjusting map data in the robot based on the localization information of the robot in the current physical space.

13. The robot of claim 12, wherein, a manner of adjusting map data in the robot based on the localization information of the robot in the current physical space by the localization processing device comprises
- compensating for a localization error of a corresponding position in the map data based on the localization information; and/or
- compensating for a localization error in landmark information related to the standard part in the map data based on the localization information.

14. The robot of claim 8, wherein, the localization processing device is further configured to invoke the behavior control application to perform a step of controlling the driving device to adjust displacement and/or pose of the robot according to the localization information.

15. The robot of claim 14, wherein, a manner of controlling the driving device to adjust displacement and/or pose of the robot according to the localization information by the localization processing device comprises:
- adjusting a navigation route of the robot based on the localization information of the robot in the current physical space;
- controlling the driving device to perform displacement and/or pose adjustment according to the navigation route.

16. The robot of claim 15, wherein, a manner of adjusting a navigation route of the robot based on the localization information of the robot in the current physical space by the localization processing device comprises: re-determining a position and an orientation of the robot in a preset map data based on the localization information, and adjusting a navigation route based on the re-determined position and orientation.

17. A storage medium of an electronic device, storing one or more programs, when the one or more computer programs are executed by one or more processors, the one or more processors implement the localization method of claim 1.

* * * * *